(12) United States Patent
Sellers

(10) Patent No.: US 6,742,300 B2
(45) Date of Patent: Jun. 1, 2004

(54) SYSTEM AND METHOD FOR ANCHORING A TREE

(76) Inventor: Andrew Sellers, 1258 Deerlake Cir., Apopka, FL (US) 32712

( * ) Notice: Subject to any disclaimer, the term of this patent is extended or adjusted under 35 U.S.C. 154(b) by 0 days.

(21) Appl. No.: 10/386,376

(22) Filed: Mar. 11, 2003

(65) Prior Publication Data

US 2003/0177694 A1 Sep. 25, 2003

Related U.S. Application Data

(60) Provisional application No. 60/363,689, filed on Mar. 12, 2002.

(51) Int. Cl.$^7$ .............................................. A01G 17/12
(52) U.S. Cl. ................................................ 47/43
(58) Field of Search ............................. 47/42, 32.5, 32.6, 47/43, 44

(56) References Cited

U.S. PATENT DOCUMENTS

| | | | |
|---|---|---|---|
| 4,222,198 A | 9/1980 | Napolitano et al. | 47/43 |
| 4,319,428 A * | 3/1982 | Fox | 47/42 |
| 4,802,317 A | 2/1989 | Chandler | 52/163 |
| 5,010,710 A | 4/1991 | Gray et al. | 52/742 |
| 5,029,427 A | 7/1991 | Jewett | 52/749 |
| 5,031,370 A | 7/1991 | Jewett | 52/166 |
| 5,649,788 A | 7/1997 | Jewett | 405/244 |
| 5,950,359 A | 9/1999 | Pivnik | 47/43 |
| 6,122,859 A * | 9/2000 | Lazar | 47/44 |
| 6,237,289 B1 | 5/2001 | Jewett et al. | 52/163 |
| 6,299,125 B1 | 10/2001 | Zayeratabat | 248/530 |
| 6,301,830 B1 | 10/2001 | Whipple | 47/43 |
| 6,389,743 B1 * | 5/2002 | Stephenson | 47/43 |

FOREIGN PATENT DOCUMENTS

| | | | | |
|---|---|---|---|---|
| DE | 19505834 C1 * | 10/1996 | | A01G/17/12 |
| EP | 784923 A1 * | 7/1997 | | A01G/17/04 |
| JP | 402069116 A * | 3/1990 | | A01G/17/14 |
| JP | 406197646 A * | 7/1994 | | A01G/17/14 |
| KR | 2001025472 A * | 4/2001 | | A01G/17/14 |

* cited by examiner

*Primary Examiner*—Son T. Nguyen
(74) *Attorney, Agent, or Firm*—Allen, Dyer, Doppelt, Milbrath & Gilchrist, P.A.

(57) ABSTRACT

A system and method for anchoring a tree is disclosed. A free end of an anchored guyline is looped around a tree. The guyline has been received through openings in the tension bar such that the tension bar is located between the anchored end of the guyline and tree. Tension is created within the guyline by pulling the tension bar. The tension bar and guyline are squeezed together and the guyline tied off at the tension bar.

21 Claims, 8 Drawing Sheets

SYSTEM AND METHOD FOR ANCHORING A TREE

RELATED APPLICATION

This application is based upon prior filed copending provisional application Serial No. 60/363,689 filed Mar. 12, 2002.

FIELD OF THE INVENTION

This invention relates to anchoring a tree, and more particularly, this invention relates to a tree anchoring system and method using a guyline that can be tensioned and tied with minimal tools, complexity, and cost.

BACKGROUND OF THE INVENTION

New trees that are recently planted must be anchored or staked. The trees are often tied by cables, ropes, and other guyline systems, such as disclosed in U.S. Pat. Nos. 6,301,830; 6,299,125; 6,237,289; 5,950,359; 5,649,788; 5,031,370; 4,802,317; and 4,222,198. Some of these systems have required a tensioning process using cables and turnbuckles similar to an aircraft cable system. Turnbuckle and similar tree anchoring systems require extensive manipulation with a tool or involve inordinate worker time to set up and maintain.

For example, U.S. Pat. No. 6,301,830 discloses a method for stabilizing trees by using a number of guylines and tension bars, which each have a tension adjustment opening having a diameter slightly greater than the diameter of the guyline and a keyhole opening. As the guylines are passed through the various openings in the tension bars, the ends of each tension bar are slid with the tension adjustment opening that bears along the respective guylines to place in compression a respective spring positioned in a limited spring extension assembly. Afterward, the tension bar is released. This is a complicated system requiring complicated use of a tension bar and spring. It is also time consuming.

Other prior art tree anchoring systems take as long as 30 minutes to anchor and tie down a tree. It is, therefore, desirable to tie down and anchor trees in an inexpensive manner that can be accomplished in a short period of time, such as in less than 10 minutes. This is important when hourly billing rates, including workmen's compensation, can cost as much as $12.00 an hour and as high as $35.00 an hour in certain geographical areas of the country. These high billing rates can be billed to a customer at even higher rates, for example, up to about $65.00 an hour in some cases.

SUMMARY OF THE INVENTION

It is therefore an object of the present invention to provide a system and method for anchoring a tree that overcomes the disadvantages as noted above.

In accordance with the present invention, a system and method for anchoring a tree is disclosed. At least one ground anchor is driven into the ground at a selected location from the tree. A guyline has been secured to the ground anchor and has a free end. A tension bar, having two openings, has been received over the guyline through one opening such that the free end of the guyline is passed through the other opening after having been looped around the tree. In this manner, the tension bar is located between the ground anchor and tree. The tension bar is configured to be squeezed with the guyline and tied off using the free end of the guyline.

In one aspect of the present invention, the tension bar comprises a longitudinally extending bar member having opposing ends, each end having a hole through which the guyline passes. The bar member is configured to be grasped manually and pulled to create tension. The ground anchor preferably comprises a triangular shaped ground anchor and a drive rod is removably engaged to the ground anchor such that the drive rod is hammered for driving the ground anchor into the ground. It can be removed after the ground anchor is secured within the ground.

In yet another aspect of the present invention, the guyline is formed from a mesh material. At least three ground anchors have an attached guyline and tension bar for anchoring a tree by the three guylines. A protective collar on the guyline can protect the tree.

A method of the present invention is disclosed and comprises the step of looping a free end of an anchored guyline that also passes through an opening in a tension bar around a tree and through an open hole in the tension bar such that the tension bar is located between the anchored end of the guyline and the tree. The guyline is pulled to create tension within the guyline. This tension bar and guyline are squeezed together and the guyline is tied off with the anchor.

In another aspect of the present invention, tension is created within the guyline by pulling downward on the tension bar. In yet another aspect of the present invention, tension can be created within the guyline by pulling upward on the tension bar.

A stop knot can be tied with the free end of the guyline at the tension bar to allow pulling of the tension bar and adding tension to the guyline. The guyline can also be pulled after having passed the free end of the guyline through the open hole of the tension bar to take up initial slack within the guyline.

In yet another aspect of the present invention, the step of tying off the guyline with the anchor can further comprise the step of grabbing the tension bar with one hand and wrapping the loose end of the guyline around the two guyline sections above the tension bar. A knot can be tied such that the guyline sections do not separate for maintaining tension.

In yet another aspect of the present invention, the ground anchor is driven into the ground with the guyline is attached thereto to anchor the guyline. The ground anchor can be driven into the ground by hammering a removable drive rod against the ground anchor such that when the ground anchor has been driven to a desired depth into the ground, the drive rod is removed.

In another aspect of the present invention, a stop knot can be tied after having looped the guyline around the tree and tying at least one knot below the stop knot. The tension bar is pulled upward to create tension. The tension bar can also have opposing ends and opposing holes at each end through which the guyline is passed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously allows a system and method for anchoring a tree that is inexpensive and efficient, and does not require an excessive number of tools or complicated parts. At the most, the only tools required are a sledge hammer or other heavy hammer and drive rod that is hammered to drive ground anchors into the ground around the tree.

Figure 1:
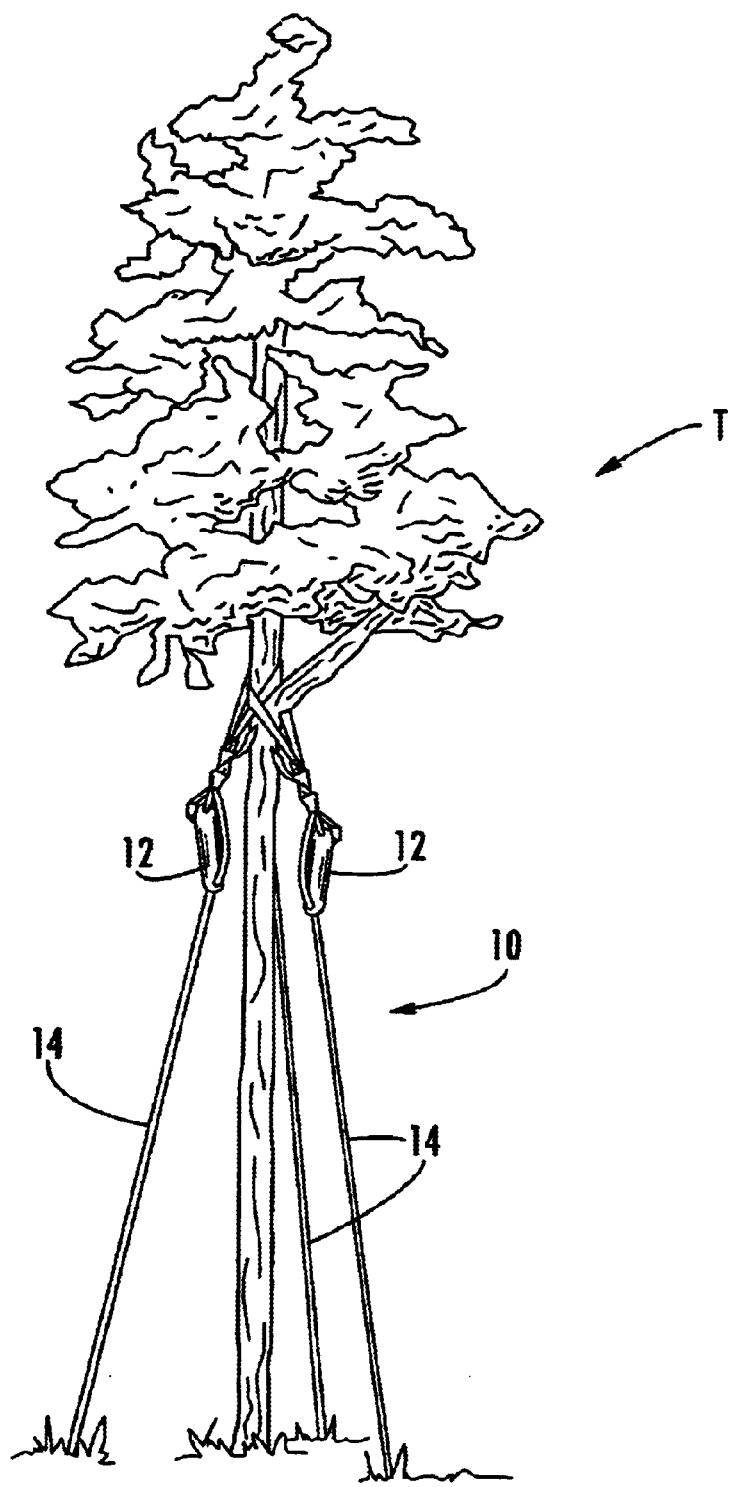
FIG. 1 is an isometric view of a tree and showing three anchored guylines that are wrapped around a tree at the lowermost branch and tensioned and tied using a tension bar in accordance with the present invention.

FIG. 1 shows a tree T that has been anchored by the system and method 10 of the present invention, and in accordance with the first embodiment, where the tension bar 12 is pulled downward to create tension in the guyline 14 as explained below.

Figure 2:
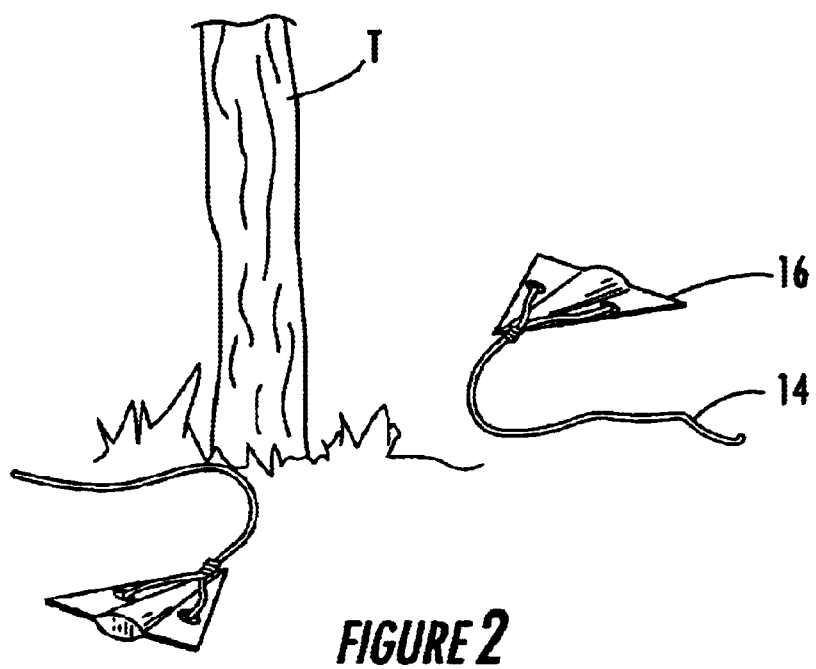
FIG. 2 is an isometric view of a tree and showing the ground anchors with the attached guylines positioned around a tree for placement.

FIG. 2 illustrates the different components used in the present invention and removed from a kit that could be commercially marketed as two or three tension bars 12, guylines 14 and ground anchors 16 within a kit. The ground anchors 16 are placed in a position surrounding the tree at a location where the ground anchors should be inserted. The guylines 14 are facing toward the tree T as illustrated.

Figure 3:
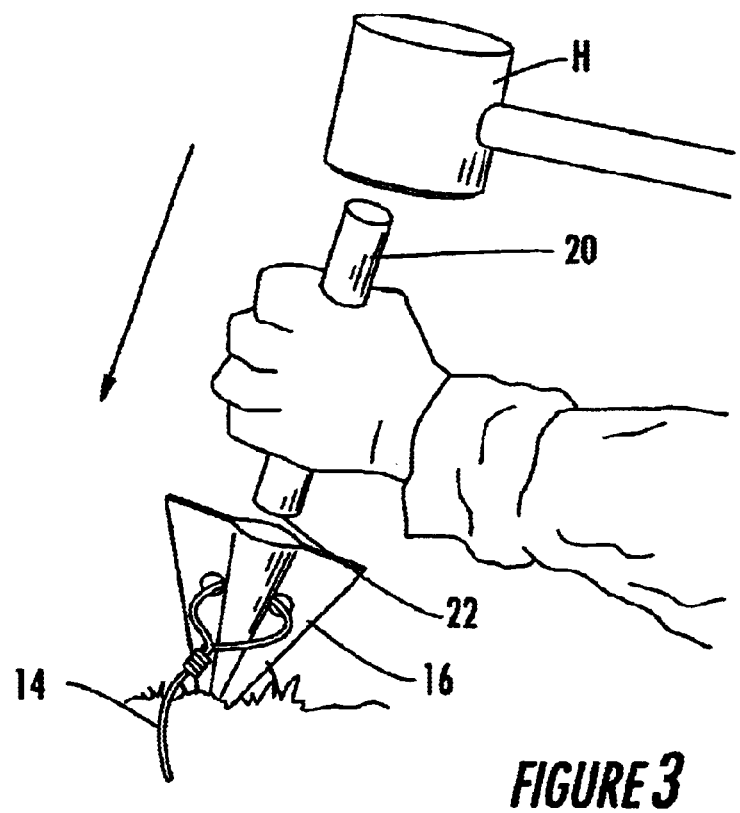
FIG. 3 is an isometric view showing the hammering of a drive rod that is removably engaged with the ground anchor for driving the ground anchor into the ground.

As shown in FIG. 3, a drive rod 20 is mounted onto the triangular or "arrowhead" configured ground anchor 16. The drive rod 20 includes a ground anchor engagement member 22, such as a mounting pin on the end of the drive rod, that is secured inside an orifice or other mounting member on the ground anchor such that as the drive rod is pounded by the hammer H, the ground anchor 16 is driven straight down about 18 inches to about 24 inches, depending on the type of soil. For example, the sandier the soil, the deeper the ground anchor should be driven. In the present invention, as the user has their back to the tree T, and the guyline 14 is grasped, it is pulled firmly toward the user until the ground anchor 16 is set and no longer pulls. It should be understood that one should not pull straight up and the guyline, but at an angle. The drive rod 20 is removed.

Figure 4:
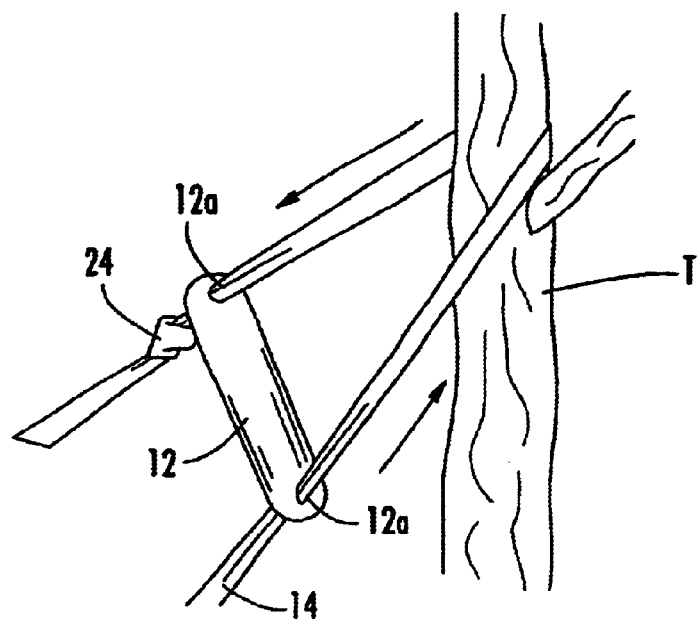
FIG. 4 is an isometric view showing the guyline wrapped around a tree near a branch and the free end of the guyline passed through an open hole in the tension bar, wherein the slack has been pulled and a stop knot created directly below the open hole.
Figure 5:
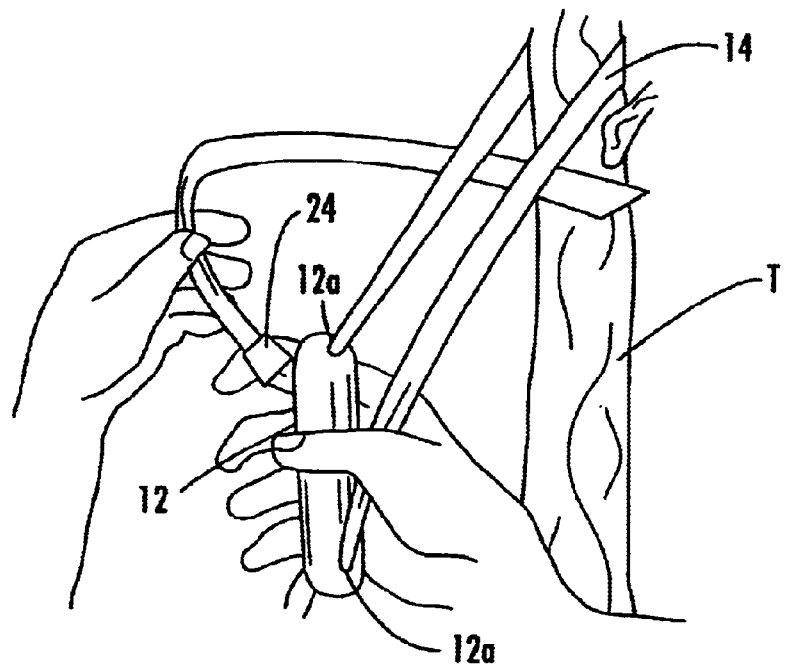
FIG. 5 is an isometric view showing the guyline and tension bar squeezed together and the free end of the guyline wrapped around both sections of the guyline that have been squeezed together.
Figure 6:
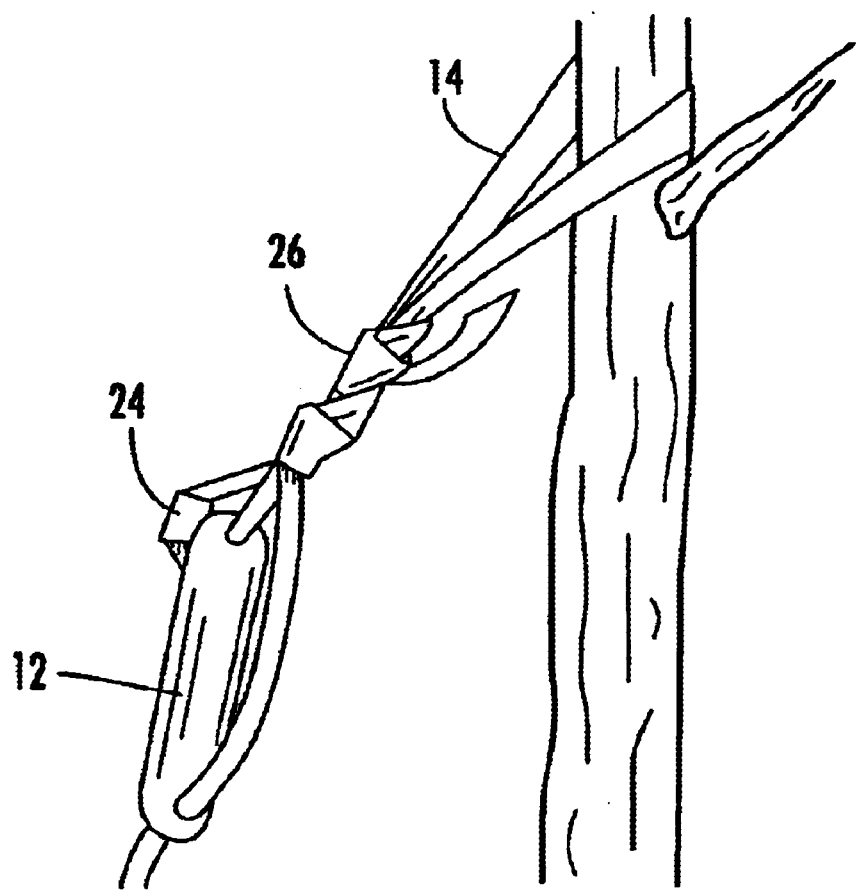
FIG. 6 is an isometric view showing a double slip knot for typing off the tension bar and the guyline and excess guyline tucked in the knot.

The tension bar 12 at this time has been received over the guyline 14. The tension bar 12 is typically formed as a longitudinally extending bar member, such as a cylindrically configured or torpedo shaped member having opposing ends and a hole 12a formed within each end through which the guyline 14 passes. It can be formed from rigid plastic or other material. The guyline 14 is wrapped around the tree T, for example, at a branch, such as a lowermost branch. The guyline 14 fed through an open hole 12a in the tension bar 12 as illustrated in FIG. 4, where the tension bar is located between the ground anchor (i.e., the ground) and the tree T. The free end of the guyline 14 is pulled to take up the slack and a stop knot 24 tied directly below the hole 12a through which the free end of the guyline passes. With one hand, the guyline 14 is grasped together with the tension bar 12 and both squeezed together, as shown in FIG. 5, to create additional tension. With the other hand, the loose end of the guyline 14 is wrapped around both sections of the guyline and squeezed together above the tension bar 12. A double slip knot 26 is preferably tied (or some other knot) and the excess guyline 14 is tucked, as shown in FIG. 6.

The guyline 14 can be formed from many different types of material. In one example of the type of material used for the guyline, a PolyPro™ mesh material, such as a 900 pound break strength material, is used. It can include a cable leader for larger diameter trees, such as a 3/32 cable leader. The system can be sold in a kit form with two or more guylines, ground anchors and tension bars sold together. At each tree to be anchored, the kit is unpacked and ready for use. Typically, at least three guylines, ground anchors and tension bars could be sold together such that a tree can be anchored or staked with at least three guylines as an example.

FIGS. 7–13 illustrate another embodiment of the present system and method where the tension bar is pulled upward instead of downward as in the embodiment of FIGS. 1–6. For purposes of description, common elements between the first embodiment shown in FIGS. 1–6 and the present embodiment shown in FIGS. 7–13 are given prime notation in the description for FIGS. 7–13.

Figure 7:
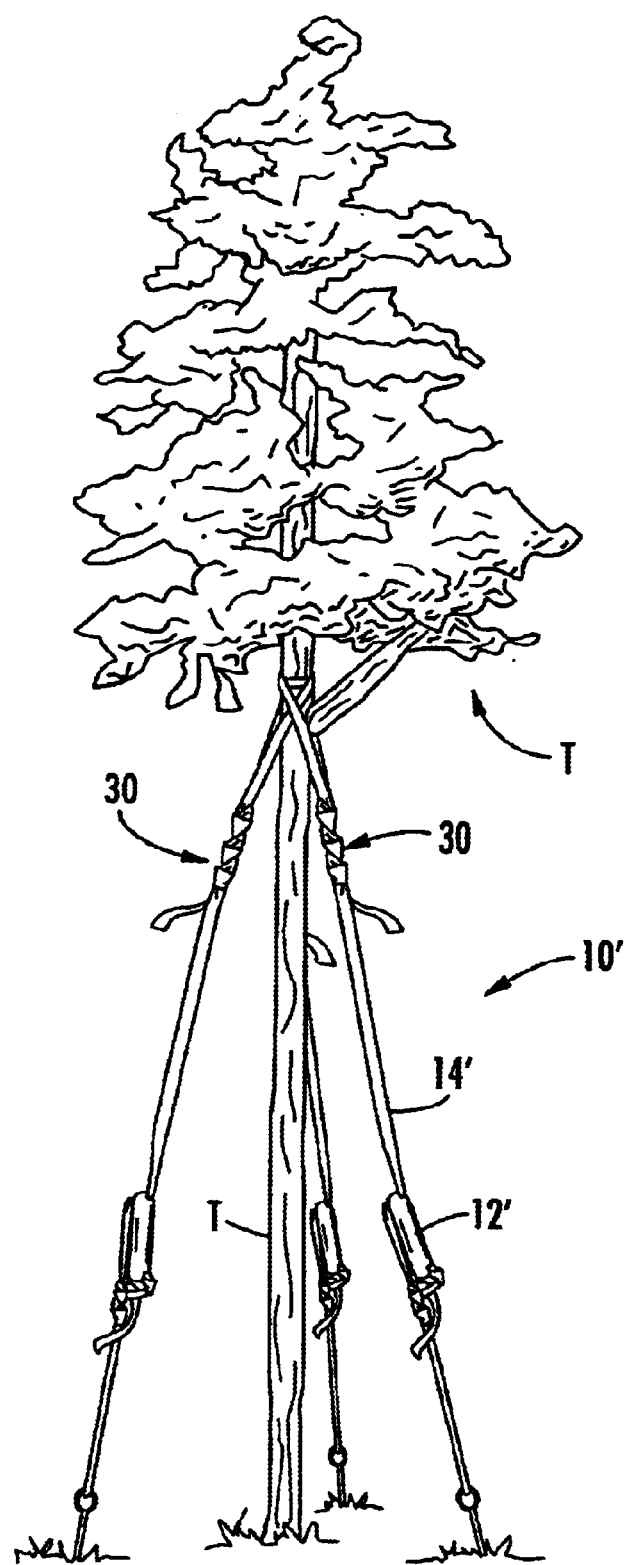
FIG. 7 is another embodiment of the present invention and showing guylines wrapped around the tree at a lowermost branch and showing a different embodiment where the guylines are wrapped around a tree and the tension bar has been pulled to create tension.

FIG. 7 shows an isometric view of the tension bar 12' and a knot 30 tied along the upper portion of the guyline 14' that is looped around the tree.

Figure 8:
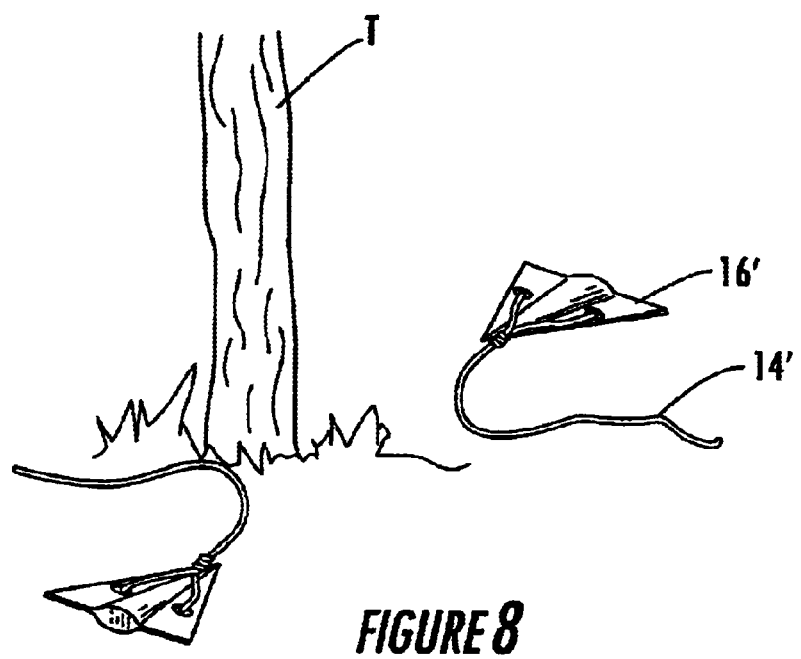
FIGS. 8 and 9 are similar to FIGS. 2 and 3 and showing the locations where a ground anchor can be secured and the hammering of the drive rod removably engaged with a ground anchor.
Figure 9:
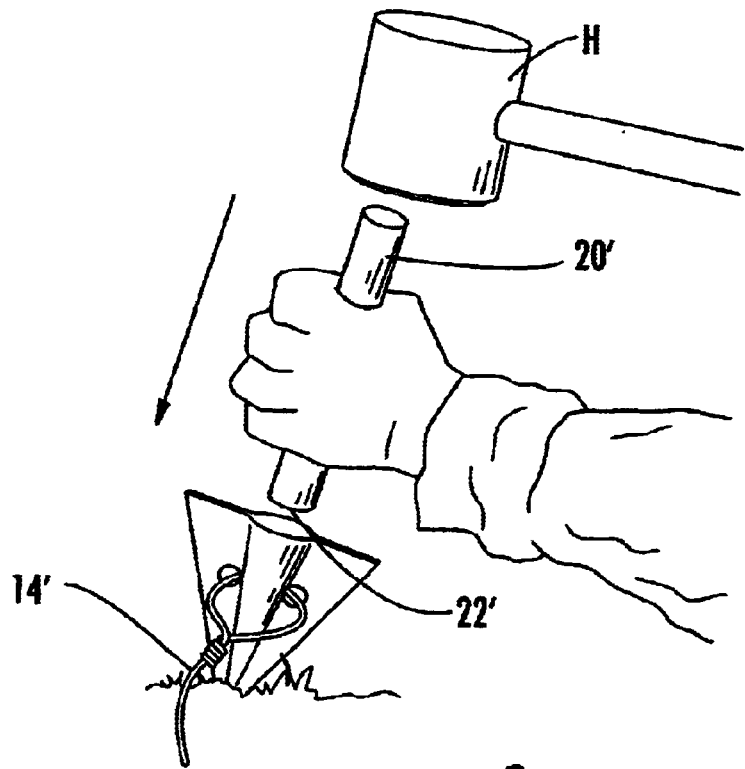
Figure 10:
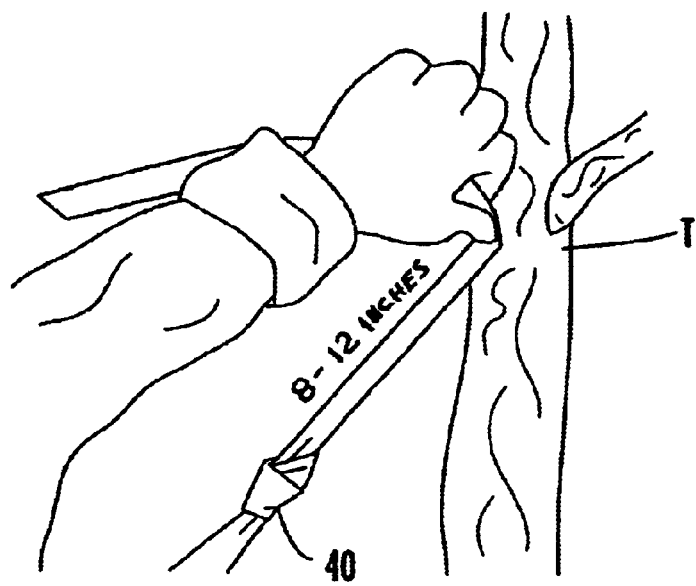
FIG. 10 shows the guyline measured 8–12 inches and a square knot established to act as a stop knot in accordance with the second embodiment shown in FIG. 7.
Figure 11:
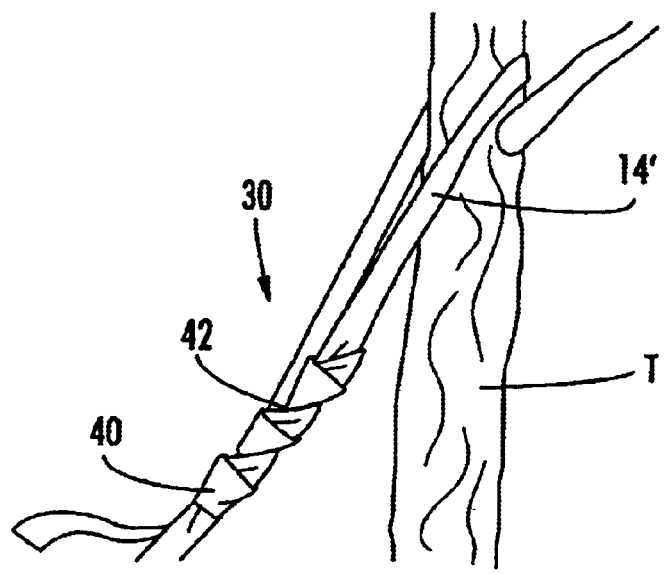
FIG. 11 is an isometric view showing the guyline looped around a tree and two consecutive knots tied below the stop knot such that the tension bar can be pulled upward toward the tree to create tension in the guyline in accordance with the second embodiment shown in FIG. 7.
Figure 12:
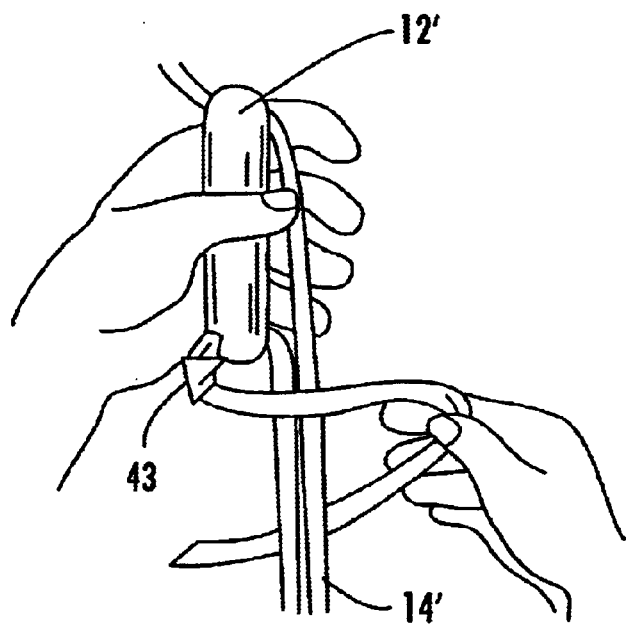
FIG. 12 is an isometric view showing the free end of the guyline wrapped around both sections that have been squeezed together below the tension bar in accordance with the second embodiment shown in FIG. 7.

FIGS. 8 and 9 are similar to FIGS. 2 and 3 and showing the ground anchors 16' positioned in a location where the ground anchors 16' are to be inserted into the soil. The guylines 14' face toward the tree T. The drive rod 20' is removably engaged with the ground anchor 16' and using a hammer H, the ground anchor is driven straight down about 18 inches to about 24 inches, depending on the soil content, as before. The sandier the soil, the deeper the anchor is driven. The drive rod is removed as before. With their back to the tree, a user grasps and pulls firmly the guyline toward the user until the anchor is set and no longer "gives." It should be understood that it is not necessary to pull straight up.

Figure 13:
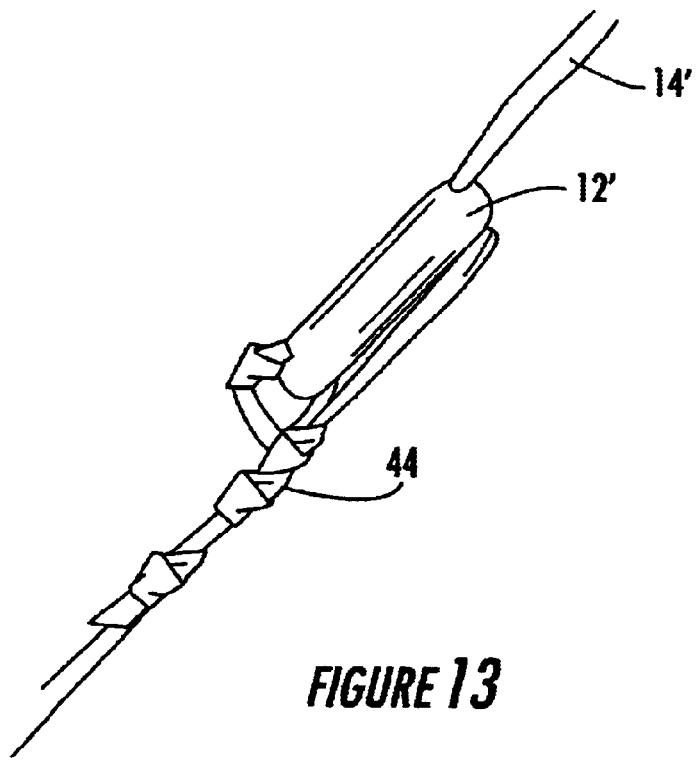
FIG. 13 is an isometric view showing a double slip knot tied and excess guyline tucked in below the knot in accordance with the second embodiment shown in FIG. 7.

The guyline 14' is matched up to the first branch or some other location on the tree. At this point, the user measures back down the guyline 14' about 8 inches to about 12 inches to establish a square knot 40 that will act as a "stop knot." The guyline 14' is wrapped around the tree at that first established branch and two consecutive knots 42 are tied below the stop knot 40 to form the knot 30 as shown in FIG. 7. The two knots 42 are slid to the stop knot 40. With their back to the tree, the user grasps the tension bar 12' and pulls firmly upward and toward the tree to establish tension on the guyline 14'. With one hand, the user grips the tension handle and the guyline together and makes a stop knot 43. After making this knot 43, and with the other hand, the user wraps the loose end of the guyline around both sections directly below the tension bar. A double slip knot 44 can be tied to maintain tension and excess guyline 14 is tucked below the knot as shown in FIG. 13.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method for anchoring a tree comprising the steps of:
    looping a free end of an unanchored guyline that also passes through an opening in a tension bar around a tree and through an open hole in the tension bar such that tension bar is located between the anchored end of the guyline and tree;
    tying a stop knot within the free end of the guyline at the tension bar to allow pulling of the tension bar and creating tension within the guyline;
    squeezing the tension bar and guyline together; and
    tying off the guyline secured with an anchor.
2. A method according to claim 1, and further comprising the step of creating tension within the guyline by pulling downward on the tension bar.
3. A method according to claim 1, and further comprising the step of creating tension within the guyline by pulling upward on the tension bar.
4. A method according to claim 1, and further comprising the step of pulling the guyline after having passed the free end of the guyline through the open hole of the tension bar to take up initial slack within the guyline.
5. A method according to claim 1, wherein the step of tying off the guyline with the anchor further comprises the step of grabbing the tension bar with one hand and wrapping the loose end of the guyline around guyline sections above the tension bar.
6. A method according to claim 5, and further comprising the step of tying a knot to maintain tension.
7. A method according to claim 1, and further comprising the step driving a ground anchor having the guyline attached there into the ground to anchor the guyline.
8. A method according to claim 7, and further comprising the step of driving the ground anchor into the ground by hammering a removable drive rod against the ground anchor such that when the ground anchor has been driven to a desired depth into the ground, the drive rod is removed.
9. A method according to claim 1, and further comprising the step of tying a stop knot after looping the guyline around the tree and tying at least one knot below the stop knot and pulling upward on the tension bar to create tension.
10. A method according to claim 1, wherein the tension bar has opposing ends and opposing holes at each end through which the guyline is passed.
11. A method for anchoring a tree comprising the steps of:
    looping a free end of an anchored guyline that also passes through an opening in a tension bar around a tree and through an open hole in the tension bar such that tension bar is located between the anchored end of the guyline and tree;
    creating tension within the guyline;
    squeezing the tension bar and guyline together; and
    tying off the guyline secured with an anchor by grabbing the tension bar with one hand and wrapping the loose end of the guyline around guyline sections above the tension bar.
12. A method according to claim 11, and further comprising the step of creating tension within the guyline by pulling downward on the tension bar.
13. A method according to claim 11, and further comprising the step of creating tension within the guyline by pulling upward on the tension bar.
14. A method according to claim 11, and further comprising the step of tying a stop knot within the free end of the guyline at the tension bar to allow pulling of the tension bar to add tension to the guyline.
15. A method according to claim 11, and further comprising the step of pulling the guyline after having passed the free end of the guyline through the open hole of the tension bar to take up initial slack within the guyline.
16. A method according to claim 11, and further comprising the step of tying a knot to maintain tension.
17. A method according to claim 11, and further comprising the step driving a ground anchor having the guyline attached there into the ground to anchor the guyline.
18. A method according to claim 11, and further comprising the step of tying a stop knot after looping the guyline around the tree and tying at least one knot below the stop knot and pulling upward on the tension bar to create tension.
19. A method for anchoring a tree comprising the steps of:
    looping a free end of an anchored guyline that also passes through an opening in a tension bar around a tree and through an open hole in the tension bar such that tension bar is located between the anchored end of the guyline and tree;
    tying a stop knot after looping the guyline around the tree and tying at least one knot below the stop knot and pulling upward on the tension bar for creating tension within the guyline;
    squeezing the tension bar and guyline together; and
    tying off the guyline secured with an anchor.
20. A method according to claim 19, and further comprising the step of pulling the guyline after having passed the free end of the guyline through the open hole of the tension bar to take up initial slack within the guyline.
21. A method according to claim 19, wherein the step of tying off the guyline with the anchor further comprises the step of grabbing the tension bar with one hand and wrapping the loose end of the guyline around guyline sections above the tension bar.

* * * * *